United States Patent [19]
Benaglio

[11] 3,854,081
[45] Dec. 10, 1974

[54] SERVO ERROR SIGNAL GENERATOR FOR NUMERICAL CONTROL SYSTEMS

[75] Inventor: Reno V. Benaglio, Bloomfield Hills, Mich.

[73] Assignee: The Bendix Corporation, Southfield, Mich.

[22] Filed: May 14, 1973

[21] Appl. No.: 360,289

[52] U.S. Cl.................. 318/636, 318/603, 318/573
[51] Int. Cl. ........................................... G05b 21/02
[58] Field of Search................... 318/636, 603, 573; 235/151.11

[56] References Cited
UNITED STATES PATENTS

| | | | |
|---|---|---|---|
| 3,436,636 | 4/1969 | James | 318/636 X |
| 3,667,023 | 5/1972 | Sommeria | 318/636 |
| 3,749,891 | 7/1973 | Burrows et al. | 318/636 X |
| 3,771,038 | 1/1973 | Rubis | 318/636 |

Primary Examiner—B. Dobeck
Attorney, Agent, or Firm—Thomas N. Young; Lester L. Hallacher

[57] ABSTRACT

A position error signal generator for use in position servo control systems wherein means are provided for generating a ramp-type reference voltage having an amplitude which varies linearly with time between predetermined positive and negative values, means for producing a precisely located sample strobe signal which is shifted in time according to the shift in phase of a position signal and means for using the strobe signal to sample the linear reference such that the amplitude of the sampled signal is representative of a position error. In the preferred embodiment, means are provided for inverting half cycles of the linear reference voltage so as to effectively double the sampling rate but without loss of polarity significance as between leading and lagging error conditions. The subject device produces an essentially dc error signal which does not require filtering but which may be directly applied to the preamplifier of an N/C servo drive.

13 Claims, 6 Drawing Figures 3,854,081

SERVO ERROR SIGNAL GENERATOR FOR NUMERICAL CONTROL SYSTEMS

INTRODUCTION

This invention relates to numerical control systems having servo-type position control means and particularly to an improved apparatus for producing a position error signal for use by the servo-type position control means.

BACKGROUND OF THE INVENTION

Numerical control systems for use in connection with the operation of various instrumentalities, such as milling machines and drafting machines, have been known to the industry for many years. In a typical numerical control system, position commands are generated in response to the derivation of data from a record, such as a punched tape, and are applied as one of two inputs to a servo control loop. The servo control loop serves to produce an error signal representing the instantaneous difference between the commanded position of the controlled element and the actual position of the controlled element. This error signal is then applied to the motive power means of the position control system in such a fashion as to attempt to drive the error toward zero.

In the past it was believed desirable to employ a high gain servomechanism having a very small position error; i.e., the physical difference between the commanded position of the controlled element and the actual position of the controlled element was very small. This was believed to be necessary in prior art systems for accuracy in the generation of the programmed contour or tool displacement path. A problem which arises from the approach is the possibility of overshoot at sharp corners and other areas where an abrupt change in tool displacement direction is programmed. Tool inertia in a low lag servo mechanism can result in such overshoot conditions and where, for example, an inside corner is being milled, the overshoot may result in the ruination of the part. To compensate for this problem, programmers have programmed a sequential reduction of feedrate approaching the direction change area followed by a gradual increase in feedrate. The penalty which results from the approach is an increase in tape preparation time and tape length in a given program of controlled element displacement.

The alternative to a high gain, low lag servomechanism with a very small position error is a high lag, low gain servomechanism wherein the position command is substantially ahead of the actual tool position. In this type of arrangement, the tool automatically slows down as it approaches the abrupt direction change location. However, a relatively high lag system tends to produce position errors and a degradation in work quality in prior art systems.

The typical prior art servomechanism error signal generator comprises a plurality of resolvers, one resolver for each axis of controlled displacement, operative to produce a series of phase shifted sine wave signals, the degree of phase shift being a function of the departure in actual tool position from the programmed tool position at a given time. These signals are applied to a zero crossing detector to produce a squarewave having a variable phase relative to a reference signal. This phase shiftable squarewave is applied to a phase shift detector which produces an output waveform representing the position error signal. The output waveform is a pulse width modulated signal, the dc value of which represents the position error. This signal is applied to the input of the tool slide drive. The pulse width modulated signal must, however, be filtered to produce a relatively smooth voltage to produce the proper drive response.

As will be apparent to those skilled in the art, the form of the dc error signal, assuming a highly effective output filter, is a voltage which varies linearly from a negative value representing position lag to a positive value representing a position lead over a range of displacement increments representing actual position error and usually expressed in "counts" in the typical N/C system. Early error detector systems were typically limited to a range of 32 counts, both positive and negative; i.e., a full range of 64 counts wherein each count represents 0.0001 inches.

In the later prior art systems, the range of permissable error over which a linear error voltage variation could be produced was extended in order to achieve a high lag, low gain servomechanism. This extension was obtained simply by a process of frequency division such that the signals applied to the phase shift detector represented increasing numbers of error displacement counts. However, as the frequency division was carried to higher and higher orders, the pulse repetition rate of the width modulated error signal trains became lower and lower and the resulting fiber requirements became more and more stringent. In other words, the filter which smooths the pulse width modulated error signal is no longer capable of producing a ripple-free error voltage which is a linear representation of actual position error. As a practical matter a limit to which the prior art technique of frequency division can be carried in a precision system is about 4,000 counts positive and negative; i.e., four tenths of an inch in both the lead and lag conditions.

Accordingly, there exists a need for a fundamentally new and improved error signal generator for use in connection with the position servomechanism of numerical control sytems so as to produce a high lag, low gain servomechanism of even greater error range while at the same time producing a highly linear and continuous signal representing the position error.

BRIEF DESCRIPTION OF THE INVENTION

In accordance with the present invention, a smooth ripple-free error voltage having substantial symmetry about a lead and lag zero reference and substantially improved linearity throughout an extended range of position error counts is provided. In general this is accomplished by means of an apparatus for producing a position error signal for use in connection with the servo type position control means of a numerical control system wherein means are provided for generating a first periodic signal waveform representing the actual position of the controlled element in a reference coordinate system, said first periodic signal varying in phase in accordance with the actual position of the controlled element, means for producing a second periodic signal having a waveform which varies substantially linearly from a first to a second predetermined value over a time period which is related to the period of the first signal, means for sampling the second linearly varying signal at times determined by the periodicity of the first signal, such times varying over the lead-lag error range in accordance with the phase shift or time position shift of the first signal, and means for generating a substantially continuous dc signal which is related to the amplitude of the sampled value of the linearly varying reference voltage. This continuous dc signal represents the position error and is applied to the position control device of the numerical control system in the conventional fashion.

In the preferred form of the invention, the second periodic signal which is generated as a linear reference voltage is produced by means of a precision integrator circuit and is sampled twice during each full cycle thereof. In the specific embodiment of the invention, the double sampling per cycle is accomplished by means of the polarity inversion of one half cycle of the reference voltage such that each sample is not only of the same absolute magnitude for a given error of a given direction, but is also of the same polarity.

In the preferred embodiment of the invention, means are provided for generating a sampling or "strobe" signal which varies in time according to the position error of the controlled element as represented by the zero crossing of a sinusoidal feedback signal. Means are provided for monitoring or observing the occurrence in time of the zero crossing only over a relative narrow time "window" such that the failure of the signal to occur duuring the window is representative of an alarm condition and the occurrence of the signal outside of the time window is otherwise rendered ineffectual as far as the system operation is concerned.

Various features and advantage of the present invention will be best understood from a reading of the following specification which describes a specific and illustrative embodiment thereof.

DETAILED DESCRIPTION OF THE SPECIFIC EMBODIMENT

FIG. 1

Figure 1:
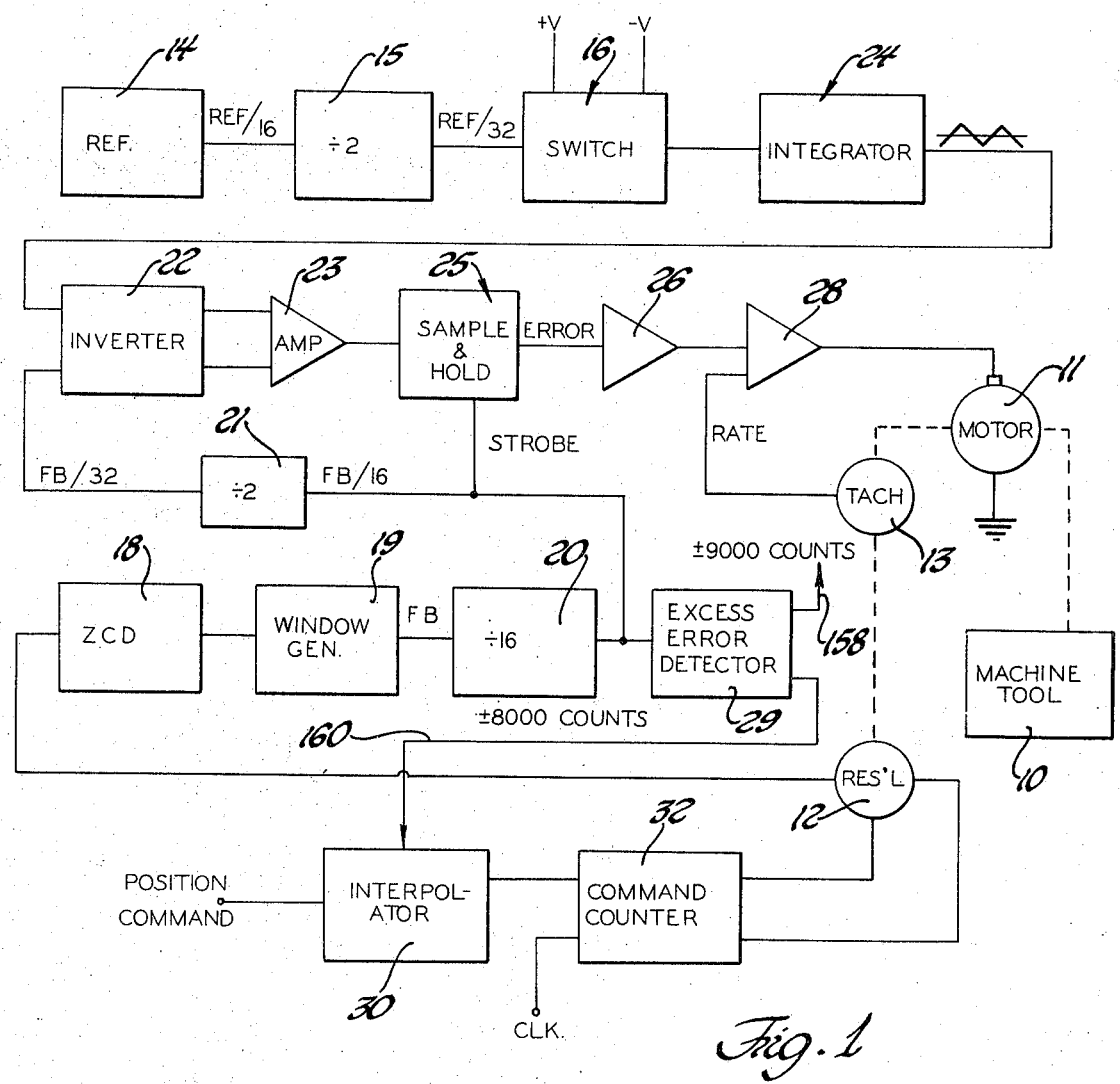
FIG. 1 is a block diagram of a numerical control system embodying the invention.

Referring now to FIG. 1, the block diagram shows a numerically controlled machine tool 10, such as a milling machine, drafting machine, or the like, having a displaceable element driven by a motor 11 by an error signal which may be either positive or negative. The motor 11 drives a tachometer generator 13 which produces an output voltage proportional to displacement rate. The motor 11 also drives a resolver 12 of conventional design so as to produce for a given axis of tool displacement a variable phase sine wave of substantially fixed frequency and amplitude but varying in phase over a range of 360 electrical degrees for each predetermined increment of tool displacement error. This basic arrangement is well known in the art. The resolver 12 is connected to receive each of two quadrature voltages as excitation signals from a command counter 32. The counter 32 is connected to receive position command pulses from an axis command interpolator 30 of conventional design. Although only one interpolator is shown, the typical N/C system employs one interpolator for each axis of controlled displacement.

The resolver produces a feedback signal which is connected as an input to a zero crossing detector 18 the output of which is a pulse-like signal of substantially periodic quality but having a phase which shifts according to the time which is representative of the zero crossings of the sine wave output from the resolver 12. The feedback pulses from the zero crossing detector 18 may be used to determine the actual position error of the machine tool 10 at any given time and constitute one of the two primary signals on which the system of the present invention operates.

The output of the zero crossing detector 18 is passed through a gate 19 in the form of a strobe signal "window" generator. This device effectively limits the time during which a zero crossing in the waveform from detector 18 will be recognized to a narrow segment of the period of the feedback waveform. Zero crossing which fall outside of the "window" in time are rejected by generator 19. The failure of the otherwise periodic pulse train can be taken to represent an alarm condition as hereinafter described with reference to FIG. 3.

The feedback pulse rate is reduced by a frequency divider 20 which may take the form of a counter. This frequency division results in the multiplication of the linear error range of the system by effectively multiplying the number of signal cycles or "counts" output from the position resolver by the frequency division factor. For example, in a system where 180° of resolver rotation produces a 500 count output, dividing the resolver output or "feedback" rate by 16 extends the measurable range to 500 × 16 or 8,000 counts. The divided feedback signal is applied, first, to an excess error detector 29 which compares the feedback error to a reference signal and which produces an output on line 160 which stops the interpolation of commands at, for example, an 8,000 count error. The detector 29 may also produce an output on line 158 to cause a a system shutdown at a 9,000 count error. These figures are, of course, given by way of example. The output of the pulse counter-frequency divider 20 is also applied through a further frequency divider 21 to an input of an inverter unit 22 which operates to invert portions, substantially half-cycles, of a precise, linear ramp voltage having a fixed phase. This ramp voltage is the other principal signal in the system of error detection illustrated in FIG. 1.

The ramp voltage is generated by applying a selected frequency component of a squarewave reference signal from a stable oscillator source 14. This signal, after further frequency reduction in counter 15, is applied to a switch 16 which alternately applies a precise positive voltage of given magnitude and a precise negative voltage of the same magnitude to an integrator 24. The result is a bipolar, symmetrical ramp voltage, the amplitude of which varies linearly from one value to another and back again at a fixed rate and with a fixed phase.

Figure 4:
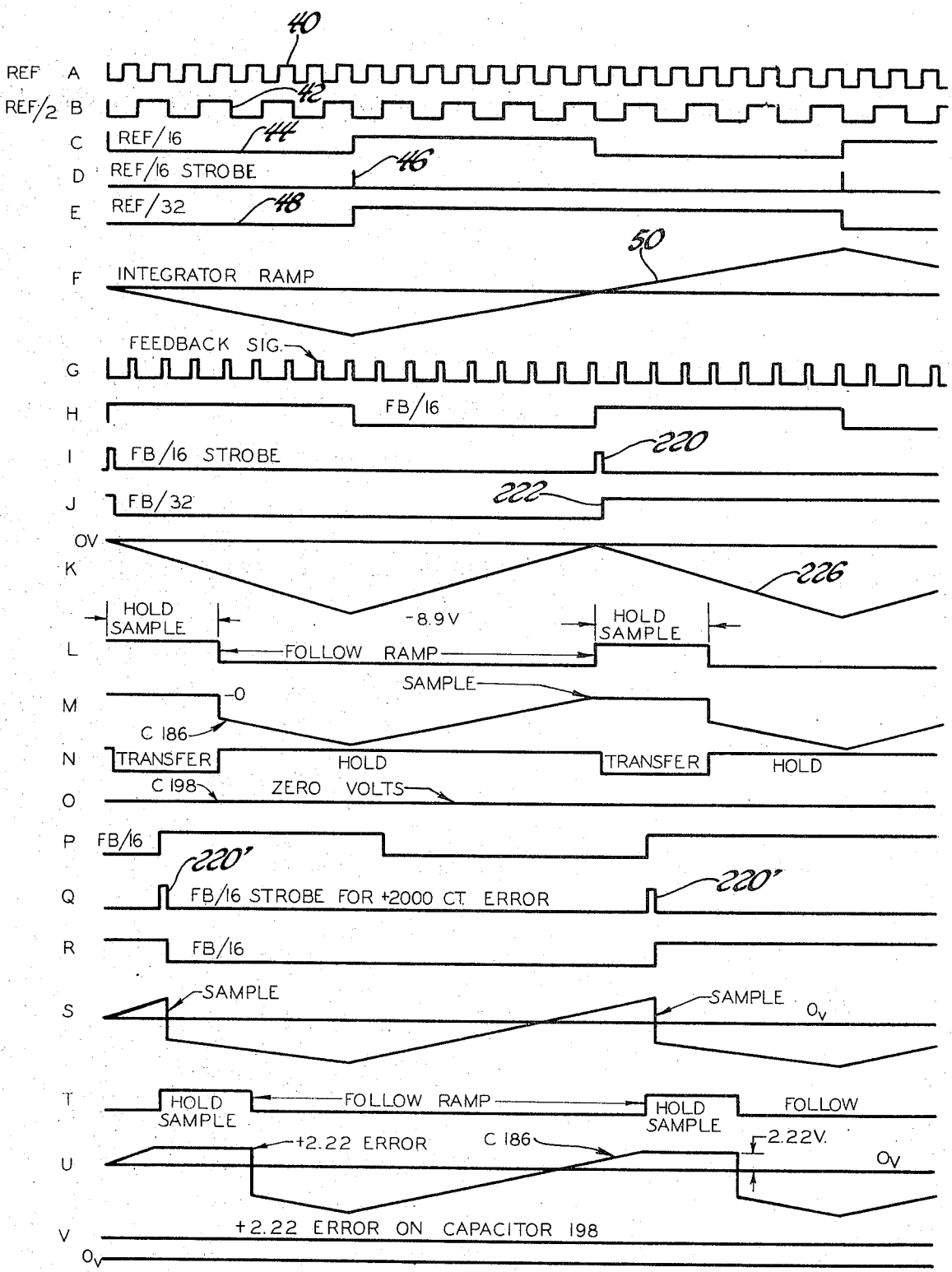

The inverter 22 simply inverts certain portions of the ramp waveform, i.e., those portions which occur between alternate pairs of feedback pulses as best shown in FIG. 4, and applies the result to a sample and hold unit 25 through a bipolar amplifier 23. The sample and hold unit also receives the FB/16 pulses from frequency divider 20 and operates to sample and store the amplitude of the ramp waveform at the time of the FB/16 pulse. This amplitude represents position error and is fed through preamplifier 26 to the drive motor power amplifier 28 to rotate motor 11 in such a direction as to drive the error signal to zero. As hereinafter described, unit 25 presents the error signal in a continuous, dc fashion requiring no filtering or smoothing steps before application to the preamplifier 26.

FIG. 2

Figure 2:
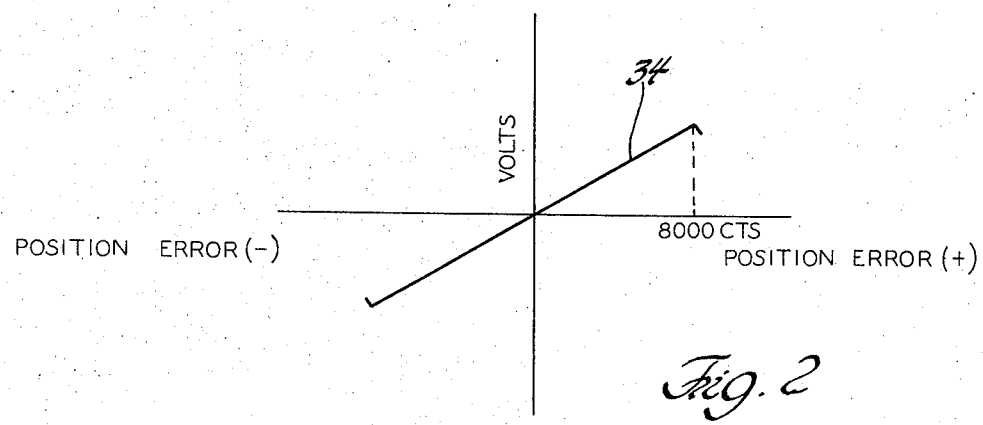
FIG. 2 is a plot of the error signal transfer characteristic which results from the use of the invention in a typical implementation.

As shown in FIG. 2, the transfer characteristic of the circuit of FIG. 1 is represented by a curve 34 which exhibits a linearly varying voltage which is positive in polarity over a leading range of 8,000 counts or eight-tenths of one inch. Curve 34 further exhibits a negatively increasing linear error voltage over the negative position error range, this representing the lag condition of the controlled elements relative to the position command. The specific values of plus and minus 8,000 counts represented in FIG. 2 are, of course, merely illustrative and are intended to be representative of the extraordinary range of the present invention. Other values may, of course, be selected in accordance with the objectives and requirements of the specific implementation of the invention.

FIGS. 3 AND 4 IN GENERAL

Looking now to FIGS. 3 and 4 of the drawings, a description of the detailed schematic diagram of the preferred embodiment to the invention will be described. Looking first to FIG. 4, the waveform diagrams on lines A, B, C, D, and E are basic timing signals which are generated by the reference timing wave generator 14 of FIG. 1. As will be apparent to those skilled in the art, such reference signals are easily generated using crystal oscillator and a plurality of cascaded frequency dividers in the form of digital counters. In the present embodiment, it is assumed that the crystal oscillator source has an output frequency of 3,000 kilohertz (KHz), the first counter output has a frequency of 3 KHz (line A), the second cascaded counter has an output of 1.5 KHz (line B), and the third cascaded counter has an output of 187.5 Hz (line C). The waveforms of line A, B, and C are identified by reference characters 40, 42, and 44, respectively, and are squarewaves which are readily generated by means of well-known digital circuitry, such as flip-flops. The waveform of line D is referred to in the drawings as "REF/16 STROBE" and comprises a periodic sequence of pulses 46. The output waveform 48 on line 3 of FIG. 4 is identified in the drawings as REF/32 and also represents a highly precise waveform having transitions which occur at half the rate of the transitions in waveform 44 of line C.

The basic reference signal which is sampled at predetermined times determined by the occurrence of the feedback signal from the resolver 12 of FIG. 1 is represented on line F of FIG. 4 and is shown to be a precise bipolar ramp having a frequency which is directly related to the frequency of the signal 48 on line E of FIG. 4. The waveform 50 varies linearly between −8.9 volts and +8.9 volts. The circuitry by which the precision, linear ramp is generated is shown in detail in FIG. 3A.

Figure 3A:
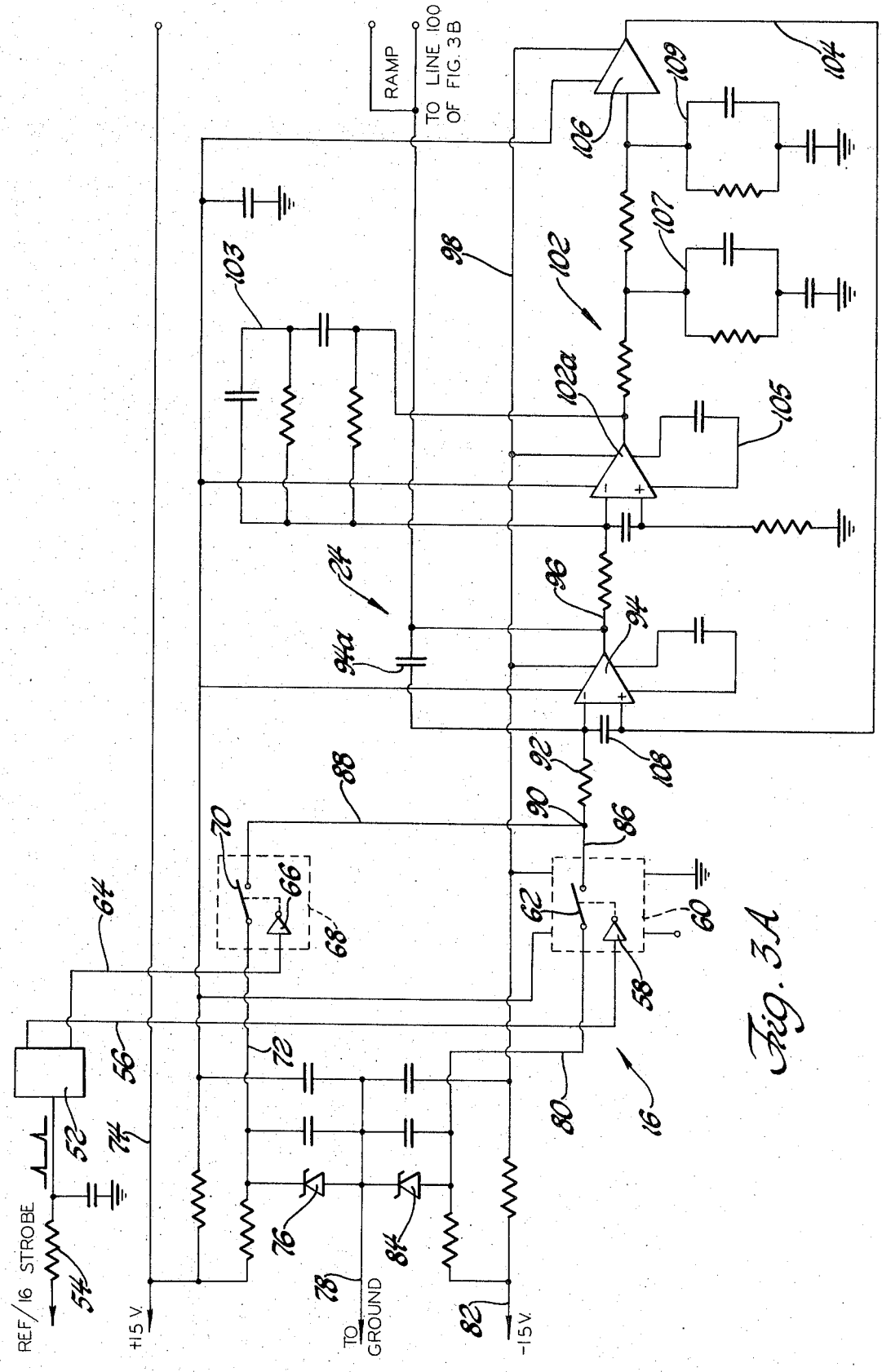
FIG. 3 is a schematic circuit diagram representing the preferred embodiment and implementation of the invention; and, FIG. 4 is a waveform diagram representing the signal quantities which occur at various points in the schematic circuit diagram of FIG. 3.
Figure 3B:
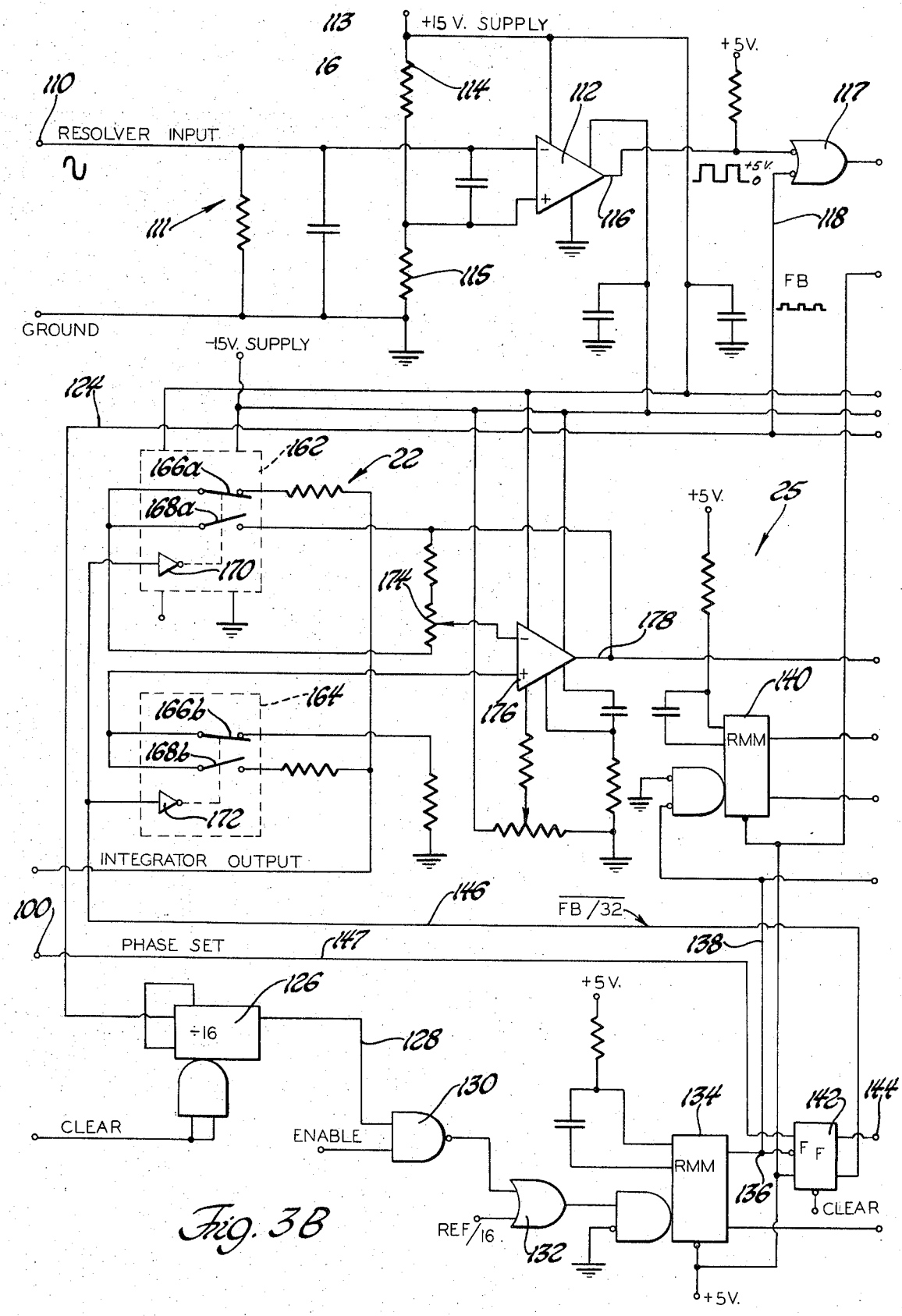
Figure 3C:
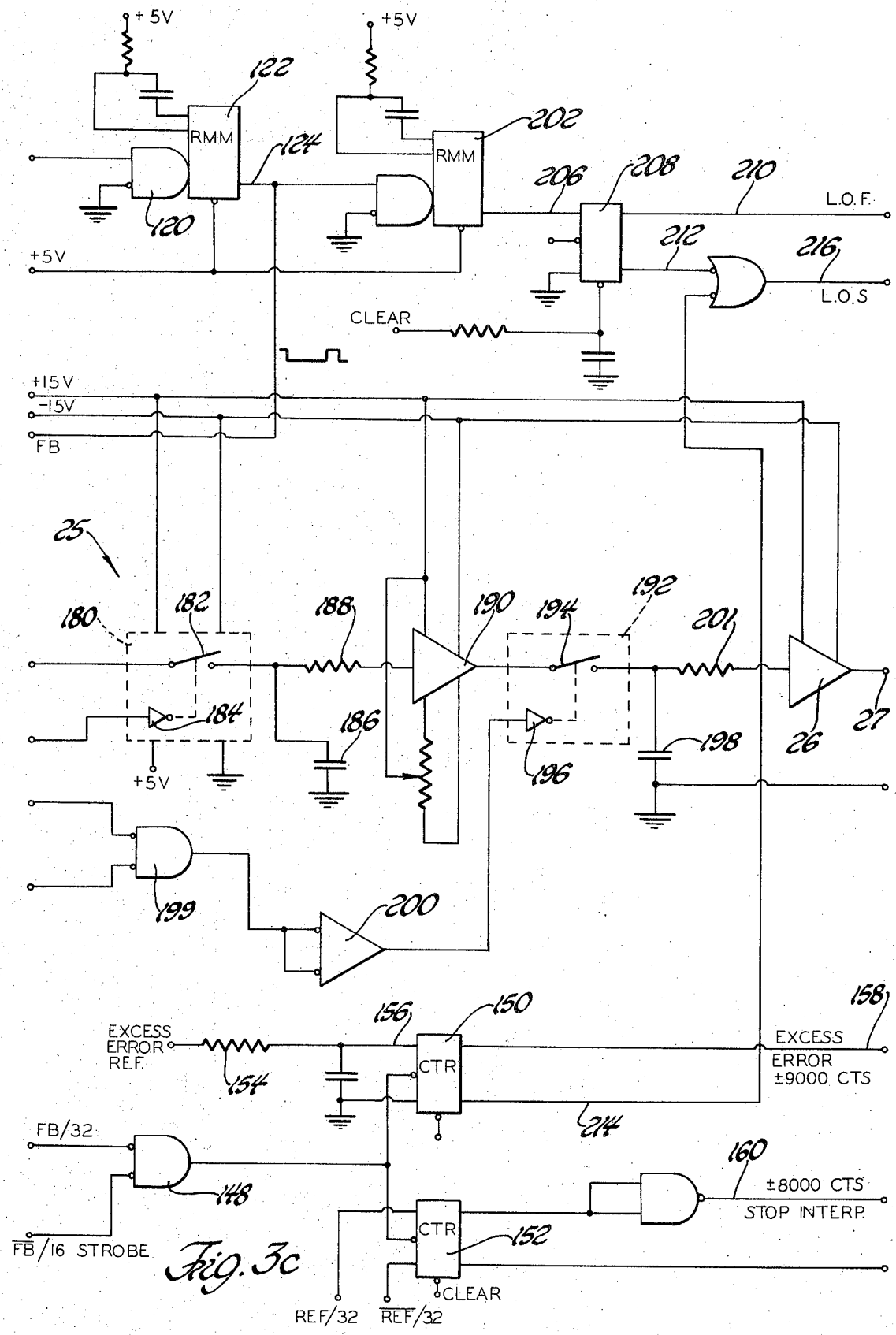

The inversion of that signal is accomplished by the circuitry of FIG. 3B, and the details of the sample and hold circuitry is shown principally in FIG. 3C.

DETAILS OF FIG. 3A

Looking now to FIG. 3A, the means by which the waveform 50 of line F is generated are shown in detail. These means comprise a conventional flip-flop circuit 52 having a timing input connected through a resistor 54 to receive the REF/16 STROBE pulses 46 illustrated on line D of FIG. 4. The flip-flop 52 controls the voltage switch 16 which, in turn, alternately applies the precise positive and negative voltage values to the integrator 24. The first output of the flip-flop 52 is connected by way of line 56 to the control device 58 of a field effect transistor switch unit 60 to control the conductivity of a field effect transistor diagrammatically illustrated in FIG. 3A as a single pole switch 62. The other output of flip-flop 52 is connected by way of line 64 to the control element 66 of a second field effect transistor switch unit 68. That unit comprises a second field effect transistor which is shown in a block 68 by the diagrammatic switch representation 70. The outputs of flip-flop 52 are, of course, complementary and, accordingly, lines 56 and 64 are alternately high to alternately close the switches 62 and 70 by way of control devices 58 and 66, respectively.

The line 72 to which switch 70 is connected receives a stable +8.9 volt reference from a 15 volt supply line 74 and a precision Zener diode 76 which is connected to ground line 78. Similarly, the input line 80 to which switch 62 is connected receives a stable −8.9 volt reference from a −15 volt supply line 82 and a voltage reference diode 84 which is also preferably a precision Zener device. The output lines 86 and 88 of the switches 62 and 70, respectively, are tied together at a common junction point 90. The voltage which appears at point 90 in FIG. 3A has the waveform which is illustrated on line E of FIG. 4; i.e., it is a precise squarewave varying between limits of ±8.9 volts dc at the frequency REF/32.

This reference squarewave is applied through resistor 92 to an integrator 24 which, as shown in FIG. 3A, comprises operational amplifier 94 having an integrating feedback capacitor 94a and having the inverting input thereof connected directly to the resistor 92. The output 96 of the operational amplifier 94 is connected by way of line 98 to the input terminal 100 of the circuit of FIG. 3B and carries a signal having the waveform 50 illustrated on line F of FIG. 4.

To ensure that the waveform 50 of line F in FIG. 4 is precisely maintained at a zero average value, the output 96 of operational amplifier 94 is further connected through a low pass filter network 102 comprising a second amplifier 102a having unbalanced feedback networks 103 and 105. The output of 102a is connected through RC filter networks 107 and 109 to the amplifier 106. The output of amplifier 106 is fedback via line 104 to the noninverting input of the operational amplifier 94. A capacitor 108 is connected between the inverting and noninverting inputs of operational amplifier 94. The signal on the feedback line 104 is a dc voltage which is typically of zero volts in value but which varies both positive and negative to compensate for drift in the dc value of the voltage waveform 50 in FIG. 4.

In summary, the circuit of FIG. 3A is employed to generate a precision voltage reference of ramp-like waveform 50, the amplitude of which varies in a precisely linear fashion between precisely determined negative and positive voltage values at a period which is related to the fundamental clock frequency of the system of FIG. 1. This signal waveform 50 is then applied to terminal 100 of the circuit of FIG. 3B, the details of which are hereinafter described.

DETAILS OF FIGS. 3B AND 3C

It is helpful in reading the following specification on FIGS. 3B and 3C to align the pages containing those FIGURES side-by-side with FIG. 3C on the right. The signal lines will then be continuous as between the two drawings.

As previously described, the linear ramp reference voltage waveform 50 shown on line F of FIG. 4 appears on input terminal 100 of the circuit in FIG. 3B. This is one of the two principal signals on which the circuit of FIG. 3B operates to produce the error signal output of substantially continuous dc waveform on output terminal 27 of FIG. 1.

The other primary signal on which the circuit of FIG. 3B operates is the resolver rotor feedback signal in the form of a phase shifting sine wave. This signal appears on input terminal 110 and, after filtering in the RC filter network 111, is applied to the squarewave generator 16 in the form of an operational amplifier 112. The inverting input of the amplifier is connected to receive the filtered resolver signal on terminal 110 and the non-inverting input is connected to receive a small dc bias by way of supply line 113 and the voltage divider resistors 114 and 115 which are serially connected between the 15 volt supply and ground as shown. The slight dc bias is such as to produce a system shut down in the event of a resolver signal loss. The bias is typically of sufficient amplitude to override any noise signal which might occur from a broken line between the resolver and the squarewave generator 16. This prevents the response of the remaining circuitry and system to spurious signal waveforms which might otherwise be falsely recognized as a resolver signal and which could result in damage to the cutter and workpiece. The output 116 of the operational amplifier 112 is a squarewave signal having a period of approximately 333 microseconds and a phase which is shifted in time in accordance with the position of the resolver rotor and, accordingly, the phase of the sine wave which is produced by the resolver on terminal 110.

This output is applied to the input of a gate 117 which responds to a timing signal on feedback line 118 to detect a zero crossing in the squarewave signal output from amplifier 112 only during a relatively narrow time window in the overall period of the squarewave signal. As a specific example, the gate 117, by means hereinafter described, passes the signal from the squarewave generator 16 for only approximately 33 microseconds out of the total period of 333 microseconds. This is accomplished by connecting the output of the gate 117 through the gate 120 of FIG. 3C to the delay circuit 122, the output of which is connected via the feedback path 118 back to the input of the gate 117. Delay circuit 122 may take the form of a retriggerable monostable multivibrator.

The output of delay circuit 122 appearing on line 124 has the waveform which is represented on line G of FIG. 4. This signal on line 124 is the basic feedback signal representing resolver position error. As previously described, the 3 KHz signal would provide a relatively narrow linear error range if phase detection were applied directly to it as it represents the cyclical signal variation coming directly from the resolver 12. Accordingly, the signal on line 124 is connected to the frequency divider 126, the output of which appears on line 128 and is represented on line H of FIG. 4 during the null or zero error condition. The result is the multiplication of the linear error range by a factor of sixteen. After the frequency division in the divider 126, the signal on line 128 is connected through gates 130 and 132 which perform simple control and selection function, such as "position error enable," and other functions which may be selected by means of a console keyboard or the like to the strobe signal generator 134. The strobe signal generator has an output 136 on which the signal waveform is as shown on line I of FIG. 4 when the circuit is in the null condition. It will be noted that this is a strobe signal which occurs at the positive edge of the signal on line H of FIG. 4, that signal appearing on line 128 of FIG. 3b. The strobe signal on output 136 is connected by way of line 138 to the delay circuit 140 and then to the sample and hold control circuitry 25 hereinafter described in detail.

The output of circuit 134 is also connected to the flip-flop frequency divider 142 to produce the complementary signals FB/32 and $\overline{FB/32}$, the first signal of which appears on line 144 and the second signal of which appears on line 146. The phase of the flip-flop output may be initially set by a signal on line 147. The signal on line 146 is connected back to the control or input terminals of the inverter circuit 22, the details of which are hereinafter described. The output 144 of flip-flop 142 is connected through a gate 148 commonly to the inputs of counters 150 and 152 of which counter 150 is connected through resistor 154 and signal line 156 to receive an "excess error reference" signal such that an output is produced on line 158 whenever the error count exceeds 9,000 (nine/tenths of one inch). Whenever a signal appears on line 158, the system is automatically shut down by means such as relay circuitry as will be apparent to those of ordinary skill in the art. Counter 152 is also connected to receive suitable reference voltages such that the appearance of a signal on line 160 causes the interpolators of the numerical control system to stop interpolating because of an excess position error. The effect of this signal is to hold the interpolators at the 8,000 error count condition assuming that the 8,000 count error represents the break point in the curve 34 of FIG. 2.

The inverter circuit 22 comprises switching stages 162 and 164 both of which comprise FET transistor switches having the connections schematically indicated in FIG. 3B so as to effectively invert part of the linear ramp signal 50 on line I of FIG. 4 during a portion of the ramp signal period between two successive pulses on line I of FIG. 4. The linear ramp signal which is applied to terminal 100 is shown to be connected commonly to the field effect transistor switches 166 and 168 of the switch stages 162 and 164, respectively, and the signal FB/32 is connected through control amplifiers 170 and 172, respectively, to control the open and closed condition of switches 166 and 168, respectively, in a complementary fashion such that when switch 166A is closed as shown, switch 168B is open as shown and vice versa. The ramp signal, if passed through switch 166A, is connected by way of an adjustable potentiometer 174 to the inverting input of the operational amplifier 176 which forms part of the inverter circuit 22. The ramp signal, if passed by switch 168B, is connected to the noninverting input of operational amplifier 176 such that the output on line 178 is as represented on line K of FIG. 4 for the null condition and, as hereinafter described in greater detail, on line S of FIG. 4 for a 2,000 count leading error condition. The output line 178 of operational amplifier 176 is then connected to the "follow and sample control stage" 180 of the sample and hold circuit 24. Stage 180 comprises a field effect transistor switch 182 having a control amplifier 184 which is connected to receive the output of the strobe circuit 140. This output is shown on line L of FIG. 4 for the null condition and has a high state for 1 millisecond after the occurrence of the FB/16 strobe. Closing switch 182 causes capacitor 186 to track or follow the integrator ramp voltage until the FB/16 strobe pulse occurs at which time the switch opens to hold the voltage amplitude at the instant of opening as a charge on capacitor 186. The output of stage 180 is connected to a resistor 188 and a transfer control amplifier 190 to a second stage 192 comprising a field effect transistor switch 194 and a control amplifier 196 which operates on the prime output of circuit 140 after having been passed through the intermediate shaping gate 198 and inverter 200. Gate 199 delays the transfer signal, line N, by the width of the strobe pulse FB/16, line I, to permit transients to settle before transfer takes place. Accordingly, complementary switching action takes place between switches 182 and 194. When switch 194 is closed, the voltage previously stored in capacitor 186 is transferred to a capacitor 198 which holds the sample during the periods between sample times. In other words, capacitor 186 periodically receives a new sample and then transfers that sample to capacitor 198. Capacitor 198 is connected through a resistor 200 to a preamplifier 26 and then to output terminal 27 which represents the final error output to be connected to the power amplifier 28 of the servo drive.

A further safety feature of the circuit of FIG. 3B involves the use of the monostable multivibrator 202 which is connected to receive the output of the delay circuit 122. The monostable multivibrator 202 is a retriggerable device which produces an output on line 206 for a period of 500 microseconds and is capable of being reset by each input signal for an additional 500 microseconds output period. If during the 500 microsecond period on the output of device 202 another input pulse fails to occur, a "loss of feedback" condition exists and the system will be shut down. This is accomplished by connecting output line 206 to a flip-flop 208 having an output line 210 which represents the loss of signal and an output 212 which is high if the feedback pulses are received at the prescribed rate. As the signal on line 212 is logically OR'd together with the output 214 of flip-flop 150 to produce an output on line 216 which represents a loss of synchronization condition. If a signal appears on the output line 216, the system is preferably shut down.

Looking now to FIG. 4, two examples of system operation will be described.

OPERATING EXAMPLE NUMBER ONE: NULL CONDITION

Lines G through O of FIG. 4 represent the relationships between the signal waveforms and the circuit of FIG. 3 for a zero error or "null" condition. The linear ramp voltage on line F of FIG. 4 is inverted for the portion following the FB/16 STROBE pulse 220 on line I of FIG. 4 which corresponds in time to the period of the positive half cycle of the square-wave 222 on line J of FIG. 4. The control signal applied to the control amplifiers 170 and 172 of the switches 166 and 168, respectively, follows the form 222 shown on line J of FIG. 4 and causes what would otherwise be a positive going portion of the linear ramp 50 to begin to go negative as shown over waveform portion 226 on line K. The sample time occurs at each transition of the waveform 222 on line J and results from the application of the pulse 220 on signal point 136 to the control device 184 of the stage 180 in the sample and hold circuit 25. Accordingly, both the inverted and noninverted portions of the ramp appearing on line 178 are sampled and the amplitudes thereof are stored in capacitor 186, as shown on line M of FIG. 4. These signals are later transferred to capacitor 198 during the "transfer" times 228 represented in the waveform N of FIG. 4. As shown on line O of FIG. 4, the net voltage which appears at the output terminal 27 for a null condition is "zero."

OPERATING EXAMPLE NUMBER TWO: A 2,000 COUNT LEAD ERROR

Lines P through V of FIG. 4 illustrate the nature of the waveforms in the specific example of FIG. 3 for a 2,000 count lead error. Waveform Q is the FB/16 STROBE and corresponds in periodicity to the signal on line I of FIG. 4. However, the phase of the pulses 220' on line Q have been shifted such that the pulses occur later in time than the pulses 220 of line I. However, the reference ramp 50 on line I of FIG. 4 is not shifted and, thus, will inherently be sampled later in time for the 2,000 count error example. The inverting and noninverting process also is shifted in time, as shown on line R of FIG. 4. The inverted linear ramp is shown for the 2,000 count error condition on line S of FIG. 4 and it will be noted that due to the shift in the FB/16 STROBE pulses the inversion of the ramp voltage is no longer uniform but rather occurs at some midpoint in the periodic variation thereof. The later sample time which results from the later occurrence of the strobe pulses produces a sampled voltage of 2.2 volts on the capacitor 186 at the end of the "follow" time and on capacitor 198 after transfer and during the "hold" time illustrated on lines T and U of FIG. 4. Accordingly, a 2.22 volt error signal appears as a continuous representation of error on output terminal 27 for the 2,000 count error condition. This signal is a continuous dc voltage and does not have to be filtered before application to the preamplifier of the servo drives as in the prior art.

As the actual position error changes; e.g., during an acceleration condition, the error voltage on terminal 27 varies in a somewhat stair-step fashion, either positively or negatively but does not have the discontinuous character of the pulse width modulated signal of the prior art. Accordingly, even abrupt changes in position error do not result in the degradation of error signal which is inherent in prior art devices having extended error range capabilities.

It is to be understood that the invention has been described with reference to a specific and illustrative embodiment and that the foregoing description is not to be construed in a limiting sense.

The embodiments of the invention in which an exclusive property or privilege is claimed are defined as follows:

1. In a numerical control system for controlling the position of a controlled element within a predetermined coordinate system according to a stored program, a servo positioning apparatus comprising: first means operatively associated with said controlled element for producing a periodic signal quantity which varies in phase according to the position error of said controlled element relative to a commanded position; second means for producing a periodic reference signal in the form of an electrical voltage having an amplitude which varies linearly between maximum and minimum values over a period which is related to the period of said periodic signal quantity from said first means and of fixed phase and having a characteristic which varies substantially linearly over the period thereof, and third means interconnected with said first and second means for sampling and holding a quantity related to the instantaneous characteristic of said reference signal quantity upon the occurrence of said periodic signal quantity from said first means whereby the character of said reference quantity at the sample time represents the position error of said controlled element said first means including means for producing a sample strobe for each of said first periodic signal quantities.

2. Apparatus as defined in claim 1 including inverter means for inverting substantially half cycles of said reference signal quantity at times related to said sample strobes whereby the sampled amplitudes are of consistent polarities for a given character of position error.

3. Apparatus as defined in claim 1 wherein said first means comprises a resolver for producing a substantially sinusoidal output quantity and a zero crossing detector connected to receive said output quantity for producing a substantially square waveform output having a phase which varies accordingly to the phase of the resolver output.

4. Apparatus as defined in claim 1 including gate means connected to receive said periodic signal quantity from said first means and operative to produce an alarm signal whenever said periodic signal quantity varies in periodicity by more than a predetermined amount.

5. Apparatus as defined in claim 4 wherein said gate means includes a retriggerable monostable signal generator having a period greater than the period of said periodic signal quantity, and logic gate means connected to receive the output of said signal generator.

6. Apparatus as defined in claim 1 wherein said second means comprises an integrator circuit having two inputs and an output, one of said inputs being connected to receive a periodic reference waveform which, when integrated, produces said linearly varying character.

7. Apparatus as defined in claim 6 including first and second precision voltage sources of opposite polarity and switch means connected between said sources and said one input to alternately apply the opposite polarity voltages from said sources to said one input.

8. Apparatus as defined in claim 1 wherein said third means includes a first stage having signal storage means operative to receive the sampled character of said linearly varying signal quantity, and a second stage connected to the first stage and having signal storage means operated complementally therewith to receive and hold the cumulative sampled quantities to produce a substantially continuous output quantity representing said position error.

9. Apparatus as defined in claim 8 wherein said signal storage means of the first and second stages include capacitors.

10. Apparatus as defined in claim 8 wherein said third means further comprises control means having an input connected to receive said periodic signal quantity, and first and second complementary outputs connected to control said first and second stages, respectively.

11. In a numerical control system for controlling the position of a controlled element within a predetermined coordinate system according to a stored program, a servo positioning apparatus comprising: first means operatively associated with said controlled element for producing a periodic signal quantity which varies in phase according to the position error of said controlled element relative to a commanded position; second means for producing a periodic reference signal quantity of fixed phase and having a characteristic which varies substantially linearly over the period thereof, and third means interconnected with said first and second means for sampling and holding a quantity related to the instantaneous characteristic of said reference signal quantity upon the occurrence of said periodic signal quantity from said first means whereby the character of said reference quantity at the sample time represents the position error of said controlled element, said second element comprising an integrator circuit having two inputs and an output, one of said inputs being connected to receive a periodic reference waveform which, when integrated, produces said linearly varying character.

12. Apparatus as defined in claim 11 including first and second precision voltage sources of opposite polarity and switch means connected between said sources and said one input to alternately apply the opposite polarity voltages from said sources to said one input.

13. A numerical control system for controlling the position of a controlled element within a predetermined coordinate system according to a program of position commands and comprising: a source of position commands, interpolator means for generating a digital pulse count representing the position command, a motor responsive to an input signal quantity of a substantially d.c. character to move the controlled element, first means operatively associated with the controlled element for producing a periodic strobe pulse which varies in phase according to the position error of the controlled element relative to the commanded count, second means for producing a linearly varying ramp voltage of fixed phase, means interconnected with the first and second means for sampling and holding the amplitude of the ramp voltage upon the occurrence of the strobe pulse whereby the amplitude of the ramp voltage at the sample time represents the position error of the controlled element, and means for applying a substantially d.c. signal quantity which is directly proportional to the sampled voltage amplitude to the motor means for moving the controlled element.

* * * * *